United States Patent Office 3,185,674
Patented May 25, 1965

3,185,674
CRYSTALLINE POLY(2,2,2-TRIFLUOROETHYL VINYL ETHER), CRYSTALLINE IN THE UN-ORIENTED STATE
Richard F. Heck, McDaniel Crest, Wilmington, Del., assignor to Hercules Powder Company, Wilmington, Del., a corporation of Delaware
No Drawing. Filed Sept. 14, 1959, Ser. No. 839,546
2 Claims. (Cl. 260—91.1)

This invention relates to polymers of trifluoroethyl vinyl ether that are characterized by having a high molecular weight and possessing a high degree of crystallinity.

Many attempts have been made to polymerize 2,2,2-trifluoroethyl vinyl ether, but in every case the polymer has been either a soft, waxlike product or a rubberlike polymer, all of which polymers have been amorphous in character.

Now in accordance with this invention it has been found that 2,2,2-trifluoroethyl vinyl ether can be polymerized to a high molecular weight, crystalline polymer. This polymer is a truly crystalline product exhibiting a very strong crystalline X-ray diffraction pattern and having a melting point of about 128° C.

This new crystalline poly(trifluoroethyl vinyl ether) is solvent resistant, being soluble in acetone, but insoluble in methanol, ethanol, heptane, benzene and dioxane. It may be formed into films and fibers which are capable of being oriented. It may also be compression molded into variously shaped objects. It may be used to fabricate pipes, tank linings, in protective coatings, and injection molded parts such as valves and gears, plastic containers, etc.

The new crystalline poly(2,2,2 - trifluoroethyl vinyl ether) of this invention is readily obtained by polymerizing 2,2,2-tri-fluoroethyl vinyl ether, preferably in an inert liquid organic diluent, using as the catalyst the reaction product obtained by mixing an aluminum alkoxide or aluminum alkyl with sulfuric acid. These catalysts may be used as such or they may be further activated by the addition of aluminum trialkyls or complexes thereof with tetrahydrofuran or with metal alkoxides such as aluminum isopropoxide, titanium isopropoxide, etc. Another type of catalyst that is also effective is the reaction product of a metal sulfate such as aluminum sulfate, titanium sulfate, etc., with a metal alkyl as, for example, an aluminum trialkyl, aluminum alkoxide, titanium alkoxide, etc. In general, the polymerization is carried out at a temperature of from about $-50°$ C. to about $+50°$ C. and the amount of catalyst used will generally be within the range from about 0.01% up to about 10% by weight of the monomer. Suitable diluents for carrying out the polymerization are methylene chloride, chloroform, heptane, chlorobenzene, benzene, toluene, etc.

When the polymerization is carried out as described above, the polymer is readily isolated from the solution or slurry of polymer and diluent by simply removing the diluent by evaporation or other such means. Frequently it is desirable to add a stabilizer as the diluent is removed at an elevated temperature. The polymer may then be purified to remove the catalyst residues by washing with an alcoholic solution of acid or base or by dissolving the polymer in acetone, filtering to remove the insoluble catalyst and then separating the polymer from the so-purified solution.

In many cases a small amount of amorphous polymer is prepared along with the crystalline polymer. In order to obtain the highest solvent resistance and tensile strength it is generally advisable to remove the amorphous polymer. This is readily done by washing the polymer with a solvent such as methanol which dissolves the amorphous polymer, but which does not dissolve the crystalline polymer.

The following examples will illustrate the preparation of crystalline poly(2,2,2-trifluoroethyl vinyl ether) in accordance with this invention. All parts and percentages are by weight unless otherwise indicated. The molecular weight of the polymers produced in these examples is indicated by the reduced specific viscosity (RSV) given for each. By the term "reduced specific viscosity" is means the $\eta_{sp/c}$ determined on an 0.1% solution (0.1 g. of the polymer per 100 ml. of solution) of the polymer in acetone at 25° C. Where the melting point is given, it is the temperature at which birefringence due to crystallinity disappears.

Example 1

The catalyst used in this example was prepared by mixing under nitrogen 48 ml. of an 0.85 M solution of aluminum isopropoxide in heptane with 0.48 ml. of 100% sulfuric acid and shaking the mixture with glass beads for 2 hours. After standing at room temperature overnight, the catalyst was stored at $-5°$ C. until used.

A polymerization vessel with a nitrogen atmosphere was charged with 2.5 parts of 2,2,2-trifluoroethyl vinyl ether, 15 parts of chloroform, and 0.05 part of aluminum isopropoxide added as an 0.85 M solution in heptane. The reaction mixture was cooled to 0° C. and with agitation, an amount of the above catalyst mixture equivalent to 0.017 part based on aluminum was added. Agitation of the reaction mixture was continued for 2 hours at 0° C. and then at room temperature for 18 hours. The polymerization was stopped by adding 1 part of an ethanolic solution of ammonia. The reaction mixture was then evaporated to dryness in a vacuum, and the crude polymer so obtained was washed three times with methanol and then was dissolved in acetone. The acetone solution was filtered and the solvent was removed, whereby there was obtained a colorless polymer which was shown to be highly crystalline by X-ray and had a RSV of 0.46 as measured on an 0.1% solution in acetone.

Example 2

Example 1 was repeated except that benzene was used as the diluent instead of chloroform. The poly(2,2,2-trifluoroethyl vinyl ether) so obtained was shown to be crystalline by X-ray.

Example 3

Example 1 was repeated except that 3.3 parts of chlorobenzene was used as the diluent in place of the 15 parts of chloroform used in that example, and the amount of aluminum isopropoxide added to the reaction mixture was doubled. After agitating the reaction mixture at 0° C. for three hours and then at room temperature for 18 hours, the product was isolated as described in Example 1. The poly(trifluoroethyl vinyl ether) so produced had an RSV of 0.48 as measured on an 0.1% solution in acetone at 25° C.

Example 4

A polymerization vessel with a nitrogen atmosphere was charged with 13.8 parts of methylene chloride, 2.5 parts of 2,2,2-tri-fluoroethyl vinyl ether, and 0.05 part of aluminum isopropoxide added as a 0.85 M solution in heptane. The reaction mixture was cooled to 0° C. and, with agitation, an amount of the catlayst mixture described in Example 1, equivalent to 0.017 part based on aluminum was added. Agitation was continued at 0° C. for 3 hours and then at room temperature for 16 hours, after which 2 parts of a 1 M ethanolic solution of ammonia and 1 part of 1% solution of 4,4'-thiobis(6-tert-butyl-m-cresol) in ethanol were added. The reaction mixture was evaporated to dryness in a vacuum and the amorphous polymer was extracted with methanol. The insoluble polymer was purified by dissolving it in acetone, filtering the solution and then evaporating the acetone. The polymer was obtained in the form of a clear film. It was crystalline by X-ray, had a melting point of 128° C. and a carbon and hydrogen analysis of 38.67% and 4.05% respectively (theory is 38.10% carbon and 4.00% hydrogen).

*Example 5*

A polymerization vessel with a nitrogen atmosphere was charged with 11 parts of chlorobenzene, 2.5 parts of 2,2,2-trifluoroethyl vinyl ether, and 0.043 part of aluminum isopropoxide added as a 0.71 M solution in heptane. After cooling to 0° C., 0.17 part based on aluminum of the catalyst described in Example 1 was added. The reaction mixture was agitated at 0° C. for 3 hours and then at room temperatures for 16 hours. The polymerization was stopped and the polymer was isolated as in Example 4. The methanol-insoluble, acetone-soluble poly(2,2,2-trifluoroethyl vinyl ether) so obtained was shown by X-ray to be highly crystalline and it had a melting point of 126° C., and an RSV of 0.6 as measured on a 0.1% solution in acetone at 25° C. The solvent absorption of this polymer was: water 0.0%; methanol 4.2%; dioxane 22.3%; ethylene dichloride 13.1%; benzene 9.7%; and heptane 0.0%.

What I claim and desire to protect by Letters Patent is:

1. As a new composition of matter, high molecular weight, crystalline poly(2,2,2-trifluoroethyl vinyl ether), crystalline in the unoriented state, having a high degree of crystallinity and exhibiting a very strong crystalline X-ray diffraction pattern, and having a melting point of about 128° C. and a reduced specific viscosity of 0.46 to 0.6 measured on a 0.1% solution in acetone.

2. As a new composition of matter, high molecular weight, crystalline poly(2,2,2-trifluoroethyl vinyl ether), crystalline in the unoriented state, having a high degree of crystallinity and exhibiting a very strong crystalline X-ray diffraction pattern, and having a melting point of about 128° C. and a reduced specific viscosity of at least 0.46 measured on a 0.1 solution in acetone.

References Cited by the Examiner
UNITED STATES PATENTS 2,820,025 1/58 Schildknecht _____ 260—91.1
3,025,282 3/62 Christman et al. _____ 260—91.1

OTHER REFERENCES

Miller et al.: Journal of Polymer Science, vol. 44 (1960), pages 391–395 relied upon.

Miller et al.: Journal of Polymer Science, vol. 55 (1961), pages 643–656 relied upon.

Journal of Polymer Science, vol. 33 (1958), pages 510–513 relied upon.

Schildknecht et al.: Industrial and Engineering Chemistry, vol. 41 (1949), pages 1998–2003 relied upon.

Golding: Polymers and Resins (1959), D. Van Nostrand Co., Inc., Princeton, N.J., pages 22 and 548–550.

Hill: Fibres From Synthetic Polymers (1953), Elsevier Publishing Corp., New York, page 232 relied upon.

Flory: Principles of Polymer Chemistry, Cornell University Press, New York (1953), page 237 relied upon.

Schildknecht: Vinyl and Related Polymers (1952), pages 609–614.

Whitby: Synthetic Rubber, John Wiley & Sons, Inc., New York, 1954, pp. 354–356 relied upon.

Robb et al.: Progress in High Polymers, vol. 1, Academic Press Inc., New York, 1961, p. 235 relied upon.

Schildknecht et al.: Industrial and Engineering Chemistry, vol. 40, 1948, pp. 2104–2115 relied upon.

Vandenberg et al.: Journal of Polymer Science, vol. 41, pp. 519–520, 1959.

W. H. SHORT, *Primary Examiner.*

H. N. BURSTEIN, MILTON STERMAN, P. E. MANGAN, LOUISE P. QUAST, J. R. LIBERMAN,
*Examiners.*